US007139697B2

(12) United States Patent
Häkkinen et al.

(10) Patent No.: US 7,139,697 B2
(45) Date of Patent: Nov. 21, 2006

(54) DETERMINING LANGUAGE FOR CHARACTER SEQUENCE

(75) Inventors: Juha Häkkinen, Tampere (FI); Markku Mettälä, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 863 days.

(21) Appl. No.: 10/108,661

(22) Filed: Mar. 27, 2002

(65) Prior Publication Data

US 2002/0184003 A1 Dec. 5, 2002

(30) Foreign Application Priority Data

Mar. 28, 2001 (FI) ................... 20010644

(51) Int. Cl.
G06F 17/28 (2006.01)
G06F 17/20 (2006.01)

(52) U.S. Cl. .............................. 704/9; 704/8
(58) Field of Classification Search ............ 704/9, 704/277, 8
See application file for complete search history.

(56) References Cited

U.S. PATENT DOCUMENTS

| 5,062,143 | A   | 10/1991 | Schmitt ................. 382/36 |
|-----------|-----|---------|--------------------------------|
| 5,548,507 | A * | 8/1996  | Martino et al. ........... 704/1 |
| 5,805,832 | A * | 9/1998  | Brown et al. ............ 711/1 |
| 6,016,471 | A   | 1/2000  | Kuhn et al. ............ 704/266 |
| 6,026,410 | A * | 2/2000  | Allen et al. .......... 707/104.1 |
| 6,912,499 | B1* | 6/2005  | Sabourin et al. ......... 704/243 |

FOREIGN PATENT DOCUMENTS

EP 1014276 A2 6/2000
GB 2338369 12/1999

OTHER PUBLICATIONS

"A Tree-Based Statistical Language Model For Natural Language Speech Recognition", Bahl et al., IEEE Transactions on Acoustics, Speech and Signal Processing, vol. 37, No. 7, 1989.
"Automatic Construction of Decision Trees From Data: A Multi-Disciplinary Survey", Murthy, Data Mining and Knwoledge Discovery, vol. 4, 1998.
"Text Classification And Segmentation Using Minimum Cross-Entropy", Teahan, International Conference on Content-Based Multimedia Information Access, 2000.
"Incorporating POS Tagging Into Language Modeling" Heeman et al., Proceeding of the 5th European Conference on Speech Communication and Technology, 1997.
"A Study Of N-Gram And Decision Tree Letter Language Modeling Methods", Potamianos et al., Speech Communication, vol. 24(3), 1998.
"Two Decades Of Statistical Language Modeling: Where Do We Go From Here?", Rosenfeld, Proceedings of the IEEE, 2000.

* cited by examiner

Primary Examiner—Tālivaldis Ivars Šmits
Assistant Examiner—Abdelali Serrou
(74) Attorney, Agent, or Firm—Perman & Green, LLP (57) ABSTRACT

A method for selecting the language for a character sequence fed into a data processing device, wherein decision trees are trained for different characters on the basis of lexicons of predetermined languages. The decision trees describe language probabilities on the basis of characters in the environments of the characters. The decision trees for at least some of the characters of the character sequence fed into the data processing device are traversed, thus obtaining a probability of at least one language for each character. The language for the character sequence is selected on the basis of the probabilities obtained.

23 Claims, 4 Drawing Sheets

DETERMINING LANGUAGE FOR CHARACTER SEQUENCE

BACKGROUND OF THE INVENTION

The invention relates to determining the language for a character sequence fed into a data processing device.

Various speech recognition applications have been developed in recent years e.g. for vehicle interfaces and mobile stations. Methods are known for mobile stations for calling a desired person by uttering the name of the person into the microphone of a mobile station and establishing a call to the number according to the name uttered by the user. The current methods, however, require the pronunciation of each name to be taught to a telephone or a system in the network. Speaker-independent speech recognition improves the usability of a speech-controlled interface since this training stage is omitted. In e.g. a speaker-independent name selection, the system carries out a text-to-phoneme conversion on the names in a telephone book and compares the name uttered by the user to a determined phoneme sequence. The problem with this method is that the language used by the user in connection with each name is not known. The phoneme sequence produced from the name can thus be erroneous, which means that the identification accuracy is considerably impaired. It is possible for the user to determine the language of the name while entering the name, but as far as usability is concerned this is not a good solution.

Publications U.S. Pat. No. 5,062,143 and EP 1 014276 describe language identification. They disclose methods of identifying a language from a body of text by using "N-grams" (N-letter combinations) or on the basis of occurrence probabilities of short words. In publication U.S. Pat. No. 5,062,143, for example, the most common trigrams (three-letter sequences, such as "abc") are estimated in each target language from a training text database. In the decoding stage, a language is assigned to a text block if a certain percentage of the trigrams separated from the text is found in a trigram table. The language for which the percentage of matches is greatest is chosen. It is also possible to use common short words, such as determinants, conjunctions and prepositions in each language.

The problem with the prior art solutions is that the N-grams are not very suitable for determining the language of short words, such as names. N-grams require a lot of storage capacity, although different solutions for decreasing the amount of necessary storage capacity do exist. If name recognition is to be carried out in a mobile station, common words (determinants, conjunctions and prepositions) are not available either. Compared with other words, proper names typically follow the common regularities of a language more loosely, which further impairs the operation of the N-gram based methods.

BRIEF DESCRIPTION OF THE INVENTION

An object of the invention is thus to provide a novel and efficient method for determining a language, and an apparatus implementing the method so that the above-mentioned problems can be avoided. The objects of the invention are achieved by methods, data processing device and a computer program products which are characterized by what is disclosed in the independent claims. Preferred embodiments of the invention are disclosed in the dependent claims.

An object of the invention is to enable the language for a fed character sequence to be determined by means of decision trees. According to an aspect of the invention, character-specific decision trees are then stored in a data processing device, the decision trees describing a probability of at least one language on the basis of the character environment of each character. The environment of a character may consist of adjacent characters to the character or characters located at a greater distance from the character. When the language for a fed character sequence is to be determined, according to an aspect of the invention, decision trees for at least some of the characters of the character sequence are traversed. Each examined character is thus provided with a probability of at least one language. The language for the character sequence is selected on the basis of the language probabilities.

It is to be noted that a probability in a decision tree may be determined to be one, which means that a character is provided with only one language. A character sequence refers to any combination of characters. Typically, a character sequence consists of letters of the alphabet, but it may also comprise punctuation marks (such as commas or spaces). A character sequence may also comprise graph-like characters mainly used in Asian languages. According to an aspect of the invention, a method is provided for forming a decision tree, wherein lexicons to be used of at least two languages are selected that comprise character sequences and language tags associated therewith. The lexicons are combined into one training lexicon, decision trees being formed for different characters to be used for selecting the language for a character sequence by carrying out the following steps of:

producing questions concerning characters in the environment of the selected character on the basis of the training lexicon, comparing said questions with each other, adding nodes to the decision tree of the character, the nodes comprising questions to maximize the information gain, increasing the decision tree using the nodes until a predetermined ending criterion is met, adding leaves to the decision tree, the leaves comprising a probability of at least one language.

According to some further aspects of the invention, computer program products implementing the methods disclosed above are provided.

An advantage of the arrangement of the invention is improved efficiency of language identification. A specific advantage is a very compact presentation format, which enables the arrangement to be readily used also in devices having limited storage capacity, such as mobile stations. The method of the invention has been preliminarily tested and compared with the N-gram based methods, and the method of the invention has given better results particularly when using a relatively closed lexicon. The method has been found efficient particularly in the identification of the language of names, when the lexicon comprises proper names.

According to a preferred embodiment of the invention, the data processing device is a mobile station in a mobile communication system. The present method can then be used for selecting the language for a character sequence fed into the contact data of a mobile station supporting multilingual speech recognition, the decision trees then being formed on the basis of lexicons comprising substantially proper names. A phoneme sequence is formed for the character sequence according to the language selected therefor in accordance with the method. When the mobile station receives speech information from the user, a phoneme sequence substantially according to the speech information supplied by the user is selected, and, furthermore, a character sequence according to said phoneme sequence is selected from the contact data. The advantage of this embodiment is that language selection can be provided for speech recognition using the limited memory resources of the mobile station in an efficient manner.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

The invention can be applied to any data processing device that can be arranged to determine a language for a character sequence fed into the device.

Figure 1:
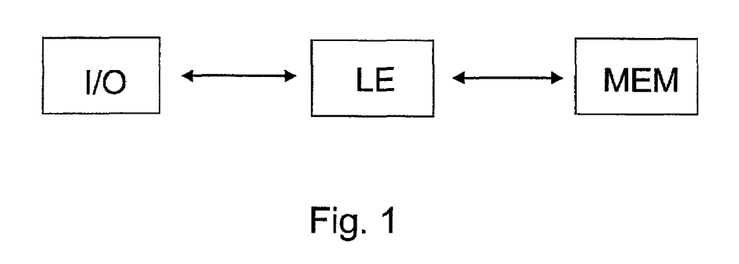
FIG. 1 is a block diagram showing a data processing device which supports language determination on the basis of a body of text fed into the device.

FIG. 1 illustrates a data processing device TE only for the parts relevant to the invention. The TE comprises I/O means I/O, a language selector block LE and memory MEM. The memory MEM comprises a read only memory ROM portion and a rewritable portion, such as a random access memory RAM and FLASH memory. Information is transmitted through the I/O means to/from the language selector block LE, which is typically a functionality implemented by software run on a processor. The I/O means may comprise a user interface, such as a microphone or a keypad, to enable a character sequence to be fed. It is also feasible that the I/O means I/O serve as a communication interface to another application or device which is able to feed the character sequence to the language selector block LE for language determination. In the data processing device TE, the language selector block LE or a separate preprocessing block may further convert the characters into a suitable format, e.g. lower-case letters, and remove characters not having decision trees. The inventive functionality of the language selector block LE can be implemented by executing program code stored in the memory MEM in the processor of the data processing device TE so that the TE is made to implement the features illustrated in FIG. 3. The program code is obtained from the internal memory of the data processing device TE, external memory means (e.g. CD-ROM) or by downloading the code from the network. Integrated circuits can also be used.

The TE can be any system comprising the above-described equipment and understanding multilingual commands. The TE can be e.g. a personal computer PC or a personal digital assistant PDA device. According to an embodiment, the TE is a mobile station further comprising a mobile station functionality for arranging wireless data transmission with a mobile telephone network. The TE may support any mobile communication standard known to one skilled in the art, e.g. a second generation global system for mobile communication GSM standard, a personal digital cellular PDC standard or a third generation mobile communication standard, such as a system called a universal mobile telecommunication systems UMTS. The TE may also comprise a functionality for accessing a wireless local area network WLAN or a private network, such as a terrestrial trunked radio TETRA.

Figure 2:
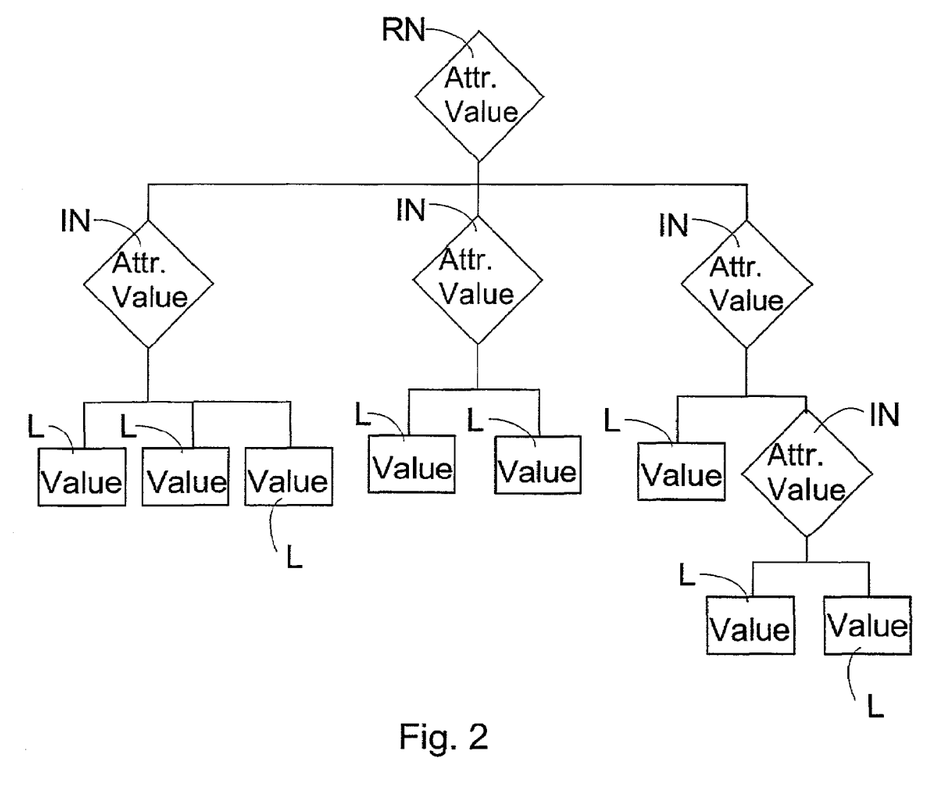
FIG. 2 illustrates the structure of a decision tree.

According to an aspect of the invention, the language for a character sequence fed into the data processing device TE is identified by means of decision trees. The decision trees describe language probabilities on the basis of the environment of the characters, i.e. the context. FIG. 2 illustrates the structure of a decision tree. The decision tree comprises a root node RN, internal nodes IN and leaves L. The decision trees are character-specific, which means that the language can be estimated character-specifically on the basis of the characters surrounding a particular character of the fed character sequence.

The nodes RN, IN comprise attributes Attr., which are questions about the characters surrounding the characters, e.g. "Is Y the first character to the right of the character?". According to an embodiment of the invention, the questions may concern the characters on either side of the character, enabling the environment of the character to be mapped as comprehensively as possible. Since only information on the environment is used while no frequency information on different languages is stored in the environment corresponding to the particular node, an extremely compact presentation format is achieved. By answering the questions, the nodes are examined typically until a leaf is met. In the example of FIG. 2, both the nodes RN, IN and the leaves are provided with a value to give a probability of at least one language. The language for the character can thus be determined already from the node. It is desirable that the questions presented by the nodes are answered until a leaf L to provide character-specific information on the language is met. If it were always possible to proceed to the leaves, it would, as distinct from FIG. 2, be enough to show the language probabilities in the leaves L only. This, however, would require leaves L to be provided for all possible environments, which would increase the size of the decision tree considerably.

Figure 3:
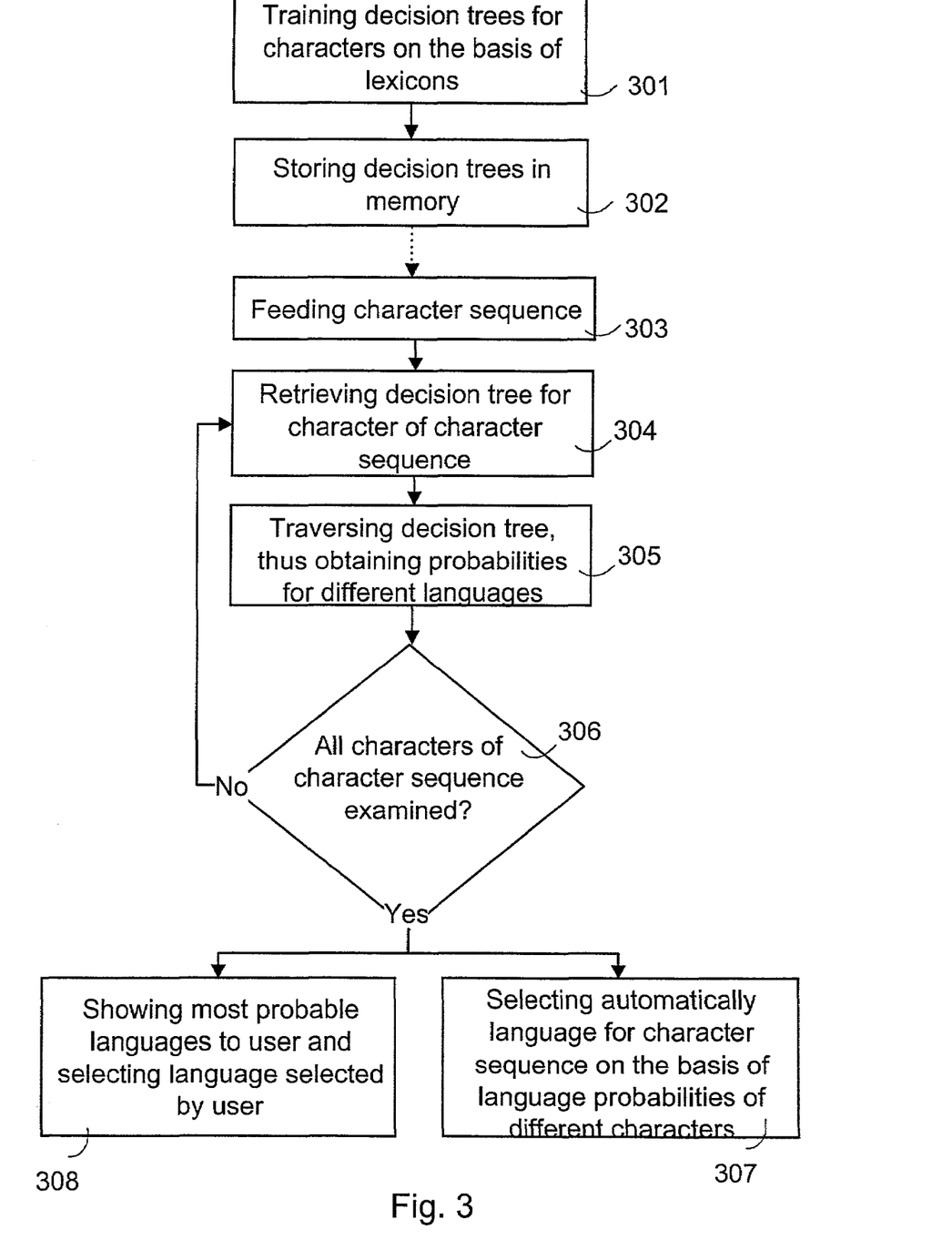
FIG. 3 is a flow diagram showing a method according to a preferred embodiment of the invention for determining the language for a character sequence by means of decision trees.

FIG. 3 shows a method according to an embodiment of the invention for determining a language by means of decision trees. Character-specific decision trees are trained 301 for the characters. The training is based on lexicons of different languages, and the decision trees are preferably trained 301 at least for the characters provided in the lexicons. How the decision trees are trained 301 for the characters will be described in closer detail below. The decision trees are stored 302 in the memory MEM of the data processing device TE.

It is to be noted that the decision trees for different characters can be formed 301 in a separate training device which is not the TE. Typically, decision trees are trained once, e.g. application specifically, and stored in the memory of the training device, wherefrom the decision trees can be transferred to the data processing devices TE through external memory means (e.g. CD-ROM) or a network. The decision trees can be stored 302 in the memory MEM of different data processing devices e.g. during the manufacturing of the TE or in connection with storing an application in need of language selection. The language selector block LE of the TE thus carries out steps 304 to 308 and the training device carries out step 301 (and also 302), which is described in closer detail in FIG. 4. Preferably, the training device is made to carry out the training-related steps illustrated in FIG. 4 by executing in the processor of the training device the program code stored in the memory. In this case, the system is an asymmetrical one wherein the time-consuming training process requiring a lot of processing capacity can be carried out as early as while designing the system. The advantage is that the actual decoding (i.e. using the decision trees) is a light procedure which can also be quickly carried out in the TE having small memory and processing resources. The data processing device TE is also easy to update since storing new decision trees will suffice while the actual functionality of the LE remains unchanged.

When a character sequence is fed 303 into the data processing device, its language selector block LE retrieves 304 a decision tree for a character of the character sequence from the memory MEM and traverses 305 the decision tree. The characters of the character sequence do not have to be examined in a particular order but characters whose decision trees will be traversed can be selected first. After the decision tree has been traversed (a leaf has been met or there is no way to proceed from a node), a probability of at least one language is achieved for the character according to the value of the node or the leaf. Preferably, all characters of the character sequence are examined, which means returning from step 306 to step 304 if the decision trees for all characters have not been examined. The LE can naturally retrieve 304 the decision trees for all characters from the memory MEM in one go, which means that the decision trees for each character do not have to be retrieved separately from the memory. In the decision tree, the probability can also be just zero or one, in which case the decision tree may give the characters only one language. When all characters of the character sequence have been provided with language probabilities from the decision trees, the language selector block LE automatically selects 307 the language on the basis of said probabilities.

According to an embodiment, the language is selected 307 on the basis of adding up the language probabilities of different characters. The language for which the total sum of probabilities is greatest is selected as the language of the character sequence.

According to another embodiment, the language which is most probable for most characters of the character sequence is selected 307 as the language of the character sequence. If the same number of characters have two (or more) languages as the most probable language, the language e.g. for which the probabilities are greatest can be selected. All the most probable languages of the characters are then treated equally.

According to an embodiment of the invention alternative to step 307, the user of the data processing device TE is provided 308 with the most probable languages to select from. The user interface of the TE can be used for showing first the language which, on the basis of the decision trees, is the most probable one. Preferably, at least one alternative language is also shown, which is the second most probable language. The user can directly accept the suggested language or select another language for the character sequence. The TE waits until the user has selected the language and selects 308 the language selected by the user to eventually be the language of the character sequence. The advantage of this embodiment is that even fewer errors are made in the language selection when the language of the character sequence is confirmed by the user.

Usually the data processing devices TE are provided with a default language, e.g. the language selected for the user interface. According to an embodiment, in dubious situations (when many substantially equally probable languages exist), the user is provided 308 with the default language to select or the default language is automatically selected 307. According to still another embodiment, more than one language can be selected 307, 308 for the character sequence. This may be necessary when the character sequence exists in many languages, e.g. the name "Peter" gives English and German as the languages.

Figure 4:
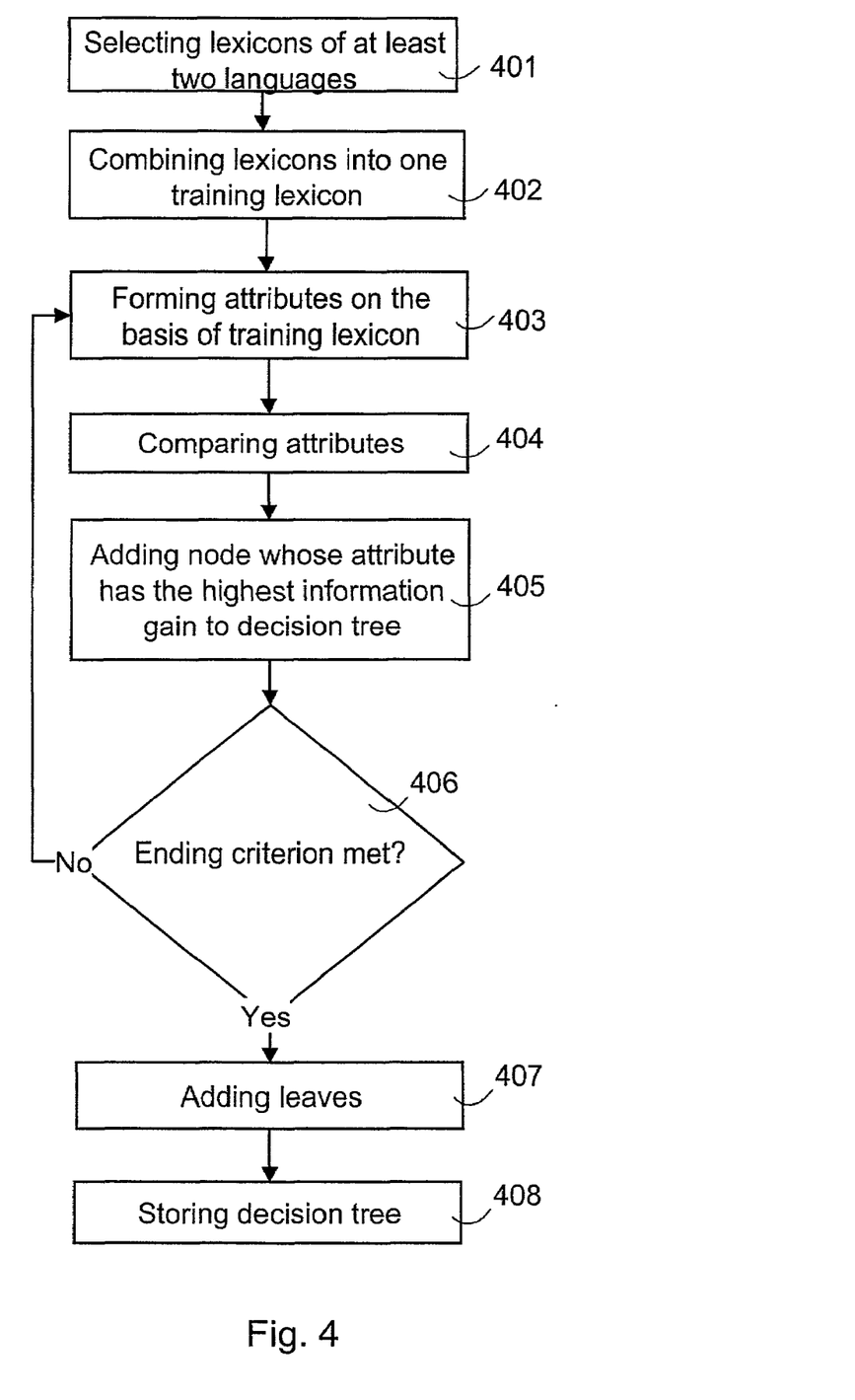
FIG. 4 illustrates a decision tree being trained.

In the following, the way in which a decision tree is trained for a character will be described in closer detail (step 301 in FIG. 3) by means of FIG. 4. In order to train a decision tree for a character, unique lexicons to be used in the training must be formed and selected 401 for each target language. The way in which the lexicons are formed is of crucial importance to the operation of decision trees, and the lexicons should be balanced according to the application. For e.g. a name-based speech recognition system, mainly proper names are stored and language tags are associated therewith. The distribution of occurrence of proper names is often irregular, so at least the most common proper names are included in the lexicons to be used. Words of another type should, however, also be included to some extent. The contents of the lexicons used of different languages are combined 402 into one training lexicon. Below, an example is shown of how the training lexicon used in the training may comprise words and language tags associated therewith. The language tags are preferably associated with the character sequences such that the language corresponding to each word is explicit, as shown in the example below.

| Juha  | Fin, Fin, Fin, Fin           |
| Peter | Eng, Eng, Eng, Eng, Eng      |
| Peter | Ger, Ger, Ger, Ger, Ger      |
| can   | Eng, Eng, Eng                |
| acht  | Ger, Ger, Ger, Ger           |

When the decision tree is trained for a given character, all training cases are taken into account. A training case of a character comprises the environment of the character and a corresponding language tag in the training lexicon. In the course of the training, the decision tree is grown and the nodes are divided into sub-nodes on the basis of an information-theoretic optimization criterion. A root node RN is first divided at least into two internal nodes IN. In order to be able to divide a node RN, IN, an attribute, i.e. a question concerning the environment of the character, has to be selected. Different attributes are formed 403 and compared 404 with each other. The one of the attributes which maximizes the optimization criterion is selected 405 as a new node. Information gain is used as an optimization criterion. In order to be able to calculate the information gain obtained by the splitting, the language distribution before the splitting must be known. Entropy E can be calculated on the basis of the language tag distribution in the node in the following manner:

$$E = -\sum_{i=1}^{N} f_i \log_2 f_i, \quad (1)$$

wherein $f_i$ is the relative frequency of language tag occurrence (in the words in the training lexicon that match the particular node), and N is the number of language tags. After entropy division, an average entropy $E^s$ is calculated for the attribute from the entropies of subsets. If $E_j^s$ describes the entropy of subset j after the division, the average entropy after the division is $$E^s = \sum_{j=1}^{K} \frac{|S_l|}{|S|} E_l^s, \quad (2)$$

where |S| is the total number of training cases in the root node RN, |S_j| is the number of training cases in the $j^{th}$ subset and K is the number of subsets. The information gain for the attribute is obtained from $$G = E - E'. \quad (3)$$

Information gain is calculated 403 for each attribute, and the attribute which has the largest information gain is selected 405. The nodes are divided 403 to 405 as long as the information gain is larger than zero and the entropies of the nodes can be improved by dividing the nodes. In addition to meeting the information gain criterion, the node IN, RN can be divided only if at least two internal nodes exist that have at least the minimum number of training sequences after the division.

According to an embodiment of the invention, the nodes are divided (406→403) until a predetermined ending criterion is met on the basis of a checking procedure 406. An ending criterion may consist of e.g. restricting the decision tree to be smaller than a predetermined size, restricting the decision tree to be of a given depth (how many steps can at most be formed after the root node RN in order to reach the most distant leaf), or the fact that the information gain obtained by the splitting remains below a predetermined limit value. Naturally, a combination of the above-mentioned criteria can be used. It is also feasible to restrict the size of a decision tree by adjusting the ending criteria or by applying a pruning method. When no nodes are added any longer, leaves L are added 407 to the decision tree. The leaves L and preferably also the nodes RN, IN comprise a probability of at least one language. The probability can be one, expressed only in the form of a language tag, or the probabilities of different languages can be calculated in step 407 and stored at least in the leaves L. Next, the trained decision tree can be stored 408 in a memory device, such as in the internal memory MEM of the data processing device TE. The decision trees can be stored 302 in the memory MEM of the data processing device TE from external memory means or by transferring them from the network e.g. over the Internet. Some characters may have an extremely simple decision tree, e.g. the decision tree of the character "ü" can explicitly indicate that the language is German.

According to an embodiment, in addition to the decision tree, the data processing device TE is also provided with determined rules to overrule or complete the result of a decision tree. For example, German can be determined as the language of a character sequence if the sequence comprises the character "ü", which means that the there is no need to traverse the decision trees at all. The rules can be stored 302 in the memory of the TE and they can in special situations be employed to make the language selecting process even faster.

Figure 5:
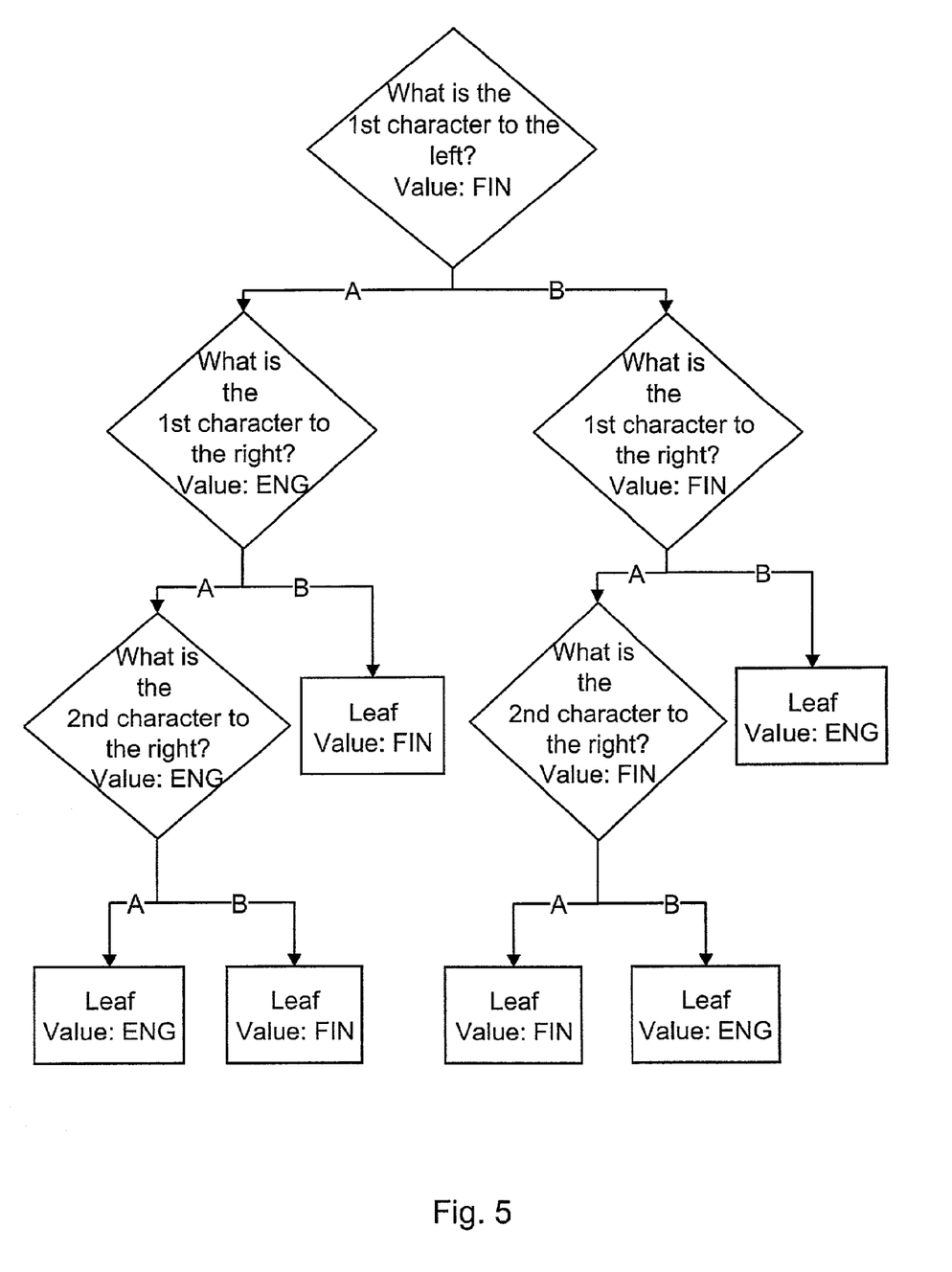
FIG. 5 shows a decision tree for the letter A.

FIG. 5 shows, by way of example, an imaginary decision tree for the letter A. FIG. 5 shows only two internal nodes A and B for the root node RN. According to an embodiment of the invention, each node or leaf shows a probability of one language (ENG=English and FIN=Finnish) only, the probability always having a value one. Being simple and necessitating little memory, this manner of presentation is well suited to mobile stations. A probability could, however, also be determined more accurately, e.g. a leaf could have Value FIN=0.4 and Value ENG=0.6 determined therein. It is to be noted that a probability is not restricted to the common one but the probability (pseudo probability) may also be more than 1 (over 100%). It is feasible that while dividing the root node RN, all possibilities have been covered; there could be e.g. 27 nodes under the root node to cover situations A to Z. This shows that an optimal-sized decision tree enables the amount of data to be stored to be decreased considerably and an equally reliable language selection to be achieved.

The invention can be used in any application wherein a language is to be determined from a fed character sequence. A typical application in which the language determination of the invention can be used is a multilingual speaker-independent speech recognition application. For this application, phoneme conversions are determined in a mobile station for the names fed into the contact data by the user. A phoneme conversion is typically obtained using a look-up table or an automatic text-to-phoneme mapping. The mapping is typically language-dependent while look-up tables are always language-dependent, i.e. different languages have text-to-phoneme sources of their own. In order for speech recognition to work appropriately, the speech recognition application must thus first determine (steps 304 to 307/308) the languages of the character sequences of the contact data so as to enable a correct phoneme sequence to be attached to the name fed by the user into the contact data.

A phoneme sequence can be determined for the character sequence from a language-specific pronunciation dictionary. The phoneme sequence is attached to the tag of the character sequence, which can be called a name-tag. When the user utters a word, the speech recognition application, by comparing the phoneme sequences, is able to choose a correct character sequence (name) and e.g. establish a call to the number attached to the character sequence. If there are several substantially equally probable languages, the name can also be associated with several languages either automatically 307 or based on a choice 308 made by the user. The phoneme sequences for at least the two most probable languages can then be formed in the mobile station, in which case either one of the pronunciations is acceptable. The invention can naturally also be applied to speech recognition for other types of device or applications. Utilizing the language selection of the invention, users speaking different languages can be provided with a speech-controlled user interface without the user being compelled to program speech commands in advance.

A second application wherein the invention can be utilized is a search for street addresses or names of cities on the basis of speech e.g. in a navigation system. A third application is a database search on the basis of the name of the person executing the search, wherein the language and pronunciation of the name are determined. As a fourth application could be mentioned language determination in a spelling control unit, as a fifth application language determination from a scanned text (e.g. using an optical character recognition OCR technique), and as a sixth application language determination for a user interface on the basis of a name while the user is logging in to a system. A seventh application could be language determination directly from a phoneme sequence formed from the speech of the user e.g. for machine translation and interpretation.

It is obvious to one skilled in the art that as technology advances, the basic idea of the invention can be implemented in many different ways. The invention and its embodiments are thus not restricted to the examples described above but can vary within the scope of the claims.

The invention claimed is:

1. A method for selecting the language for a character sequence fed into a data processing device, the method comprising:
   storing in the data processing device character-specific decision trees to describe probabilities for at least two different languages on the basis of characters in the environments of the characters,
   traversing the decision trees for at least some of the characters of the character sequence fed into the data processing device, thus obtaining a probability of at least one language for each character, and
   selecting the language for the character sequence on the basis of said language probabilities.

2. A method as claimed in claim 1, the method further comprising:
   training the decision trees on the basis of predetermined lexicons of at least two languages.

3. A method as claimed in claim 1, wherein the decision trees comprise nodes and leaves which comprise probabilities of different languages, the nodes comprise questions concerning the characters located to the right and/or to the left of the character, and the decision tree for the character of the character sequence is traversed by answering the questions set forth in the nodes of the decision tree until a leaf determining the language probabilities is found or there is no way to proceed from a node, the character thus being provided with a probability of at least one language on the basis of said leaf or node.

4. A method as claimed in claim 1, wherein at least two languages are shown to a user to select from that are the most probable languages for the character sequence,
   the selection made by the user is read, and
   the language selected by the user is selected as the language of the character sequence.

5. A method as claimed in claim 1, wherein the language which occurs most frequently as the most probable language in the characters of the character sequence is selected automatically as the language of the character sequence.

6. A method as claimed in claim 1, wherein the probabilities of languages for different characters are added up, and
   the language for which the total sum of probabilities is greatest is selecting automatically as the language of the character sequence.

7. A method as claimed in claim 1, wherein the data processing device is a mobile station in a mobile communication system,
   the method is used for selecting the language for a character sequence fed into the contact data of a mobile station supporting multilingual speech recognition, the decision trees being formed on the basis of lexicons comprising substantially proper names,
   a phoneme sequence is formed for the character sequence according to the language selected therefor,
   in response to at least the speech information supplied by the user of the mobile station, a phoneme sequence substantially according to the speech information supplied by the user is selected, and
   a character sequence according to said phoneme sequence is selected from the contact data.

8. A method as claimed in claim 1, wherein the lexicons to be used of at least two languages are selected, the lexicons comprising character sequences and languages associated therewith,
   the lexicons are combined into one training lexicon,
   questions concerning the characters in the environment of a character are formed on the basis of the training lexicon,
   said questions are compared with each other,
   the questions maximizing the information gain are added to the nodes of the decision tree of the character,
   the decision tree is grown using the nodes until a predetermined ending criterion is met,
   leaves are added to the decision tree, the leaves comprising a probability of at least one language, and
   the decision trees are stored in a data processing device.

9. A method as claimed in claim 8, wherein the ending criterion consists of restricting the decision tree to a predetermined size or depth or the fact that the information gain obtained by adding a node remains below a predetermined amount.

10. A method for training a decision tree in a data processing device, the method comprising:
    selecting lexicons to be used of at least two languages which comprise character sequences and language tags associated therewith,
    combining the lexicons into one training lexicon, and
    forming decision trees for different characters to be used for selecting the language for a character sequence by taking the following steps of:
    forming questions concerning characters in the environment of the selected character on the basis of the training lexicon,
    comparing said questions with each other,
    adding nodes to the decision tree of the character, the nodes comprising questions, in order to maximize the information gain,
    growing the decision tree using the nodes until a predetermined ending criterion is met,
    adding leaves to the decision tree, the leaves comprising a probability of at least one language.

11. A method as claimed in claim 10, wherein the ending criterion consists of restricting the decision tree to a predetermined size or depth or the fact that the information gain obtained by adding a node remains below a predetermined amount.

12. A method as claimed in claim 10, wherein a number is determined for each of said questions by using the language tags, the number describing the information gain achieved by adding that question to the decision tree, said questions are compared on the basis of the numbers, and a node with a question having the largest information gain is added to the decision tree.

13. A data processing device comprising a language selector block for determining the language from a character sequence fed into the device and memory for storing character-specific decision trees determined on the basis of lexicons of at least two languages, the decision trees describing language probabilities on the basis of characters in the environment of the characters, wherein said language selector block is arranged to retrieve the character-specific decision trees from the memory in response to the character sequence fed into the data processing device,
    said language selector block is arranged to traverse character-specific decision trees for at least some of the characters of the character sequence until a language can be assigned to each character, and
    said language selector block is arranged to select the language for the character sequence on the basis of the languages assigned to the characters.

14. A data processing device as claimed in claim 13, wherein said data processing device is further arranged to show at least two languages to a user to select from that are the most probable languages for the character sequence, said data processing device is arranged to read the choice made by the user, and said language selector block is arranged to select the language selected by the user as the language of the character sequence.

15. A data processing device as claimed in claim 13, wherein the decision trees comprise nodes and leaves which comprise probabilities of different languages, the nodes comprising questions concerning characters located to the right and/or to the left of a character, and said language selector block is arranged to examine the decision tree for the character of the character sequence by answering the questions set forth in the nodes of the decision tree until a leaf to determine the language probabilities is found or there is no way to proceed from a node, the character thus being provided with a probability of at least one language on the basis of said leaf or node.

16. A data processing device as claimed in claim 13, wherein said data processing device is a mobile station in a mobile communication system, and said language selector block is used for selecting the language of the character sequence fed into the contact data of the mobile station supporting multilingual speech recognition, and the decision tree is formed from lexicons comprising substantially proper names, a phoneme sequence is formed for the character sequence according to the language selected therefor, and, in response to at least the speech information supplied by the user of the mobile station, a phoneme sequence substantially according to the speech information supplied by the user is selected, and, further, a character sequence according to said phoneme sequence is selected from the contact data.

17. A data processing device as claimed in claim 13, wherein the data processing device is arranged to select automatically as the language of the character sequence the language that occurs most frequently as the most probable language in the characters of the character sequence.

18. A data processing device as claimed in claim 13, wherein the data processing device is arranged to add up the probabilities of languages for different characters, and the data processing device is arranged to automatically select the language for which the total sum of probabilities is greatest as the language of the character sequence.

19. A computer program product stored on a computer readable medium for controlling a data processing device processing a character sequence, said computer program product comprising program code causing the data processing device to retrieve character-specific decision trees stored in the memory of the data processing device that describe probabilities for at least two languages on the basis of characters in the environments of the characters, traverse the decision trees for at least some of the characters of the character sequence fed into the data processing device, thus obtaining a probability of at least one language for each character, and select the language for the character sequence on the basis of said language probabilities.

20. A computer program product as claimed in claim 19, said computer program product comprising program code for causing the data processing device to select automatically as the language of the character sequence the language which occurs most frequently as the most probable language in the characters of the character sequence.

21. A computer program product as claimed in claim 19, said computer program product comprising program code for causing the data processing device to add up the probabilities of languages for different characters, and automatically select the language for which the total sum of probabilities is greatest as the language of the character sequence.

22. A computer program product stored on a computer readable medium for controlling a data processing device, said computer program product comprising program code causing the data processing device to select lexicons to be used of at least two languages, the lexicons comprising character sequences and language tags associated therewith, combine the lexicons into one training lexicon, and form decision trees for different characters to be used for selecting the language for a character sequence by taking the following steps of:

producing questions concerning characters in the environment of the selected character on the basis of the training lexicon, comparing said questions with each other, adding nodes to the decision tree of the character, the nodes comprising questions, in order to maximize the information gain, growing the decision tree using the nodes until a predetermined ending criterion is met.

23. A computer program product as claimed in claim 22, said computer program product comprising program code for causing the data processing device to determined a number for each of said questions by using the language tags, the number describing the information gain achieved by adding that question to the decision tree, compared said questions on the basis of the numbers, and add a node with a question having the largest information gain to the decision tree.

* * * * *